US005791789A

United States Patent [19]
Van Duyn et al.

[11] Patent Number: 5,791,789
[45] Date of Patent: Aug. 11, 1998

[54] ROTOR SUPPORT FOR A TURBINE ENGINE

[75] Inventors: Keven G. Van Duyn, Bloomfield; Edward B. Pero, Somers, both of Conn.

[73] Assignee: United Technologies Corporation, Hartford, Conn.

[21] Appl. No.: 842,484

[22] Filed: Apr. 24, 1997

[51] Int. Cl.$^6$ ..................................................... F16C 19/52
[52] U.S. Cl. ................................................ 384/624; 416/2
[58] Field of Search ................................. 384/624, 535, 384/537, 584; 416/2

[56] References Cited

U.S. PATENT DOCUMENTS

| | | | |
|---|---|---|---|
| 3,207,473 | 9/1965 | Madden | 253/52 |
| 3,395,857 | 8/1968 | Petrie et al. | 230/116 |
| 3,990,633 | 11/1976 | Stahl et al. | 233/23 |
| 4,193,741 | 3/1980 | Briggs | 416/170 |
| 4,201,513 | 5/1980 | Sales | 416/2 |
| 4,306,755 | 12/1981 | Roberts | |
| 4,313,712 | 2/1982 | Briggs | 416/2 |
| 4,375,906 | 3/1983 | Roberts et al. | 384/490 |
| 4,452,567 | 6/1984 | Treby et al. | 416/2 |
| 4,475,869 | 10/1984 | Davies | 416/170 |
| 4,568,325 | 2/1986 | Cheng et al. | 494/84 |
| 5,433,584 | 7/1995 | Amin et al. | 415/229 |

*Primary Examiner*—Lenard A. Footland
*Attorney, Agent, or Firm*—Kenneth C. Baran

[57] ABSTRACT

A support arrangement for a rotor shaft (10) includes a bearing (28) radially interposed between the shaft and a support frame (26). The bearing has a durable support (100) and a destructible support (104). The destructible support is nested within a circumferentially extending channel (78) having three-dimensionally curved surfaces (82, 84). An adjacent oil seal (44) has similar three-dimensionally curved surfaces (52, 54) In the event that the rotor becomes unbalanced during operation, the destructible support disengages from its housing (76) and glides radially within the channel to restrain the rotor longitudinally while precluding the transmission of imbalance forces from the rotor to the frame. The curved character of the seal surfaces preserves the integrity of the seal so that loss of oil will not prevent continued, low speed operation of the rotor. An optional, temporarily operable damper (148) attenuates especially severe vibrations immediately following the onset of the imbalance. A recentering system (164), also optional, applies a modest restorative force to recenter the disabled rotor and alter its natural frequency thereby inhibiting resonant oscillations at low rotational frequencies.

11 Claims, 3 Drawing Sheets

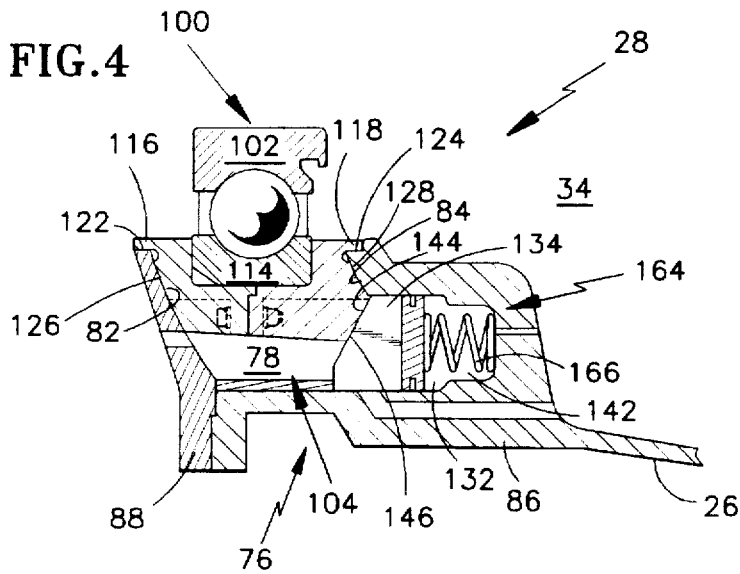
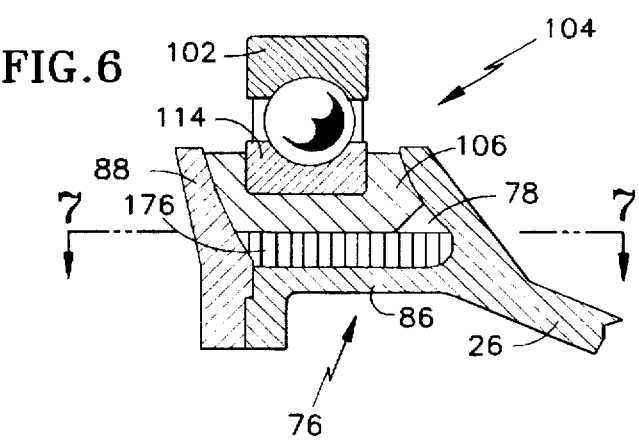
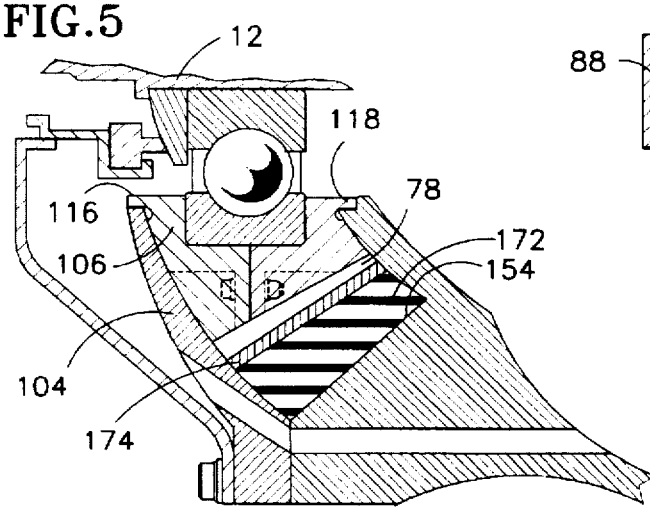
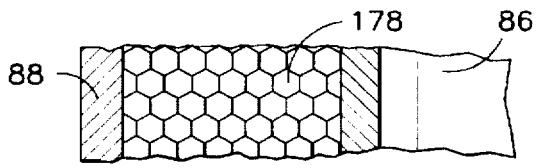

ROTOR SUPPORT FOR A TURBINE ENGINE

DESCRIPTION

TECHNICAL FIELD

This invention is an arrangement for supporting a rotor in an aircraft gas turbine engine and, in particular, is a support arrangement that accommodates oscillatory deflection of an unbalanced rotor while maintaining longitudinal support of the rotor and minimizing the transmission of potentially damaging imbalance forces to other parts of the engine.

BACKGROUND OF THE INVENTION

Gas turbine engines of the type used for aircraft propulsion have a rotor that typically includes a fan having an array of radially extending fan blades, a compressor, a turbine and a shaft for transferring power and rotary motion from the turbine to the compressor and fan. The rotor is radially and longitudinally supported on a nonrotatable support frame by two or more longitudinally spaced apart bearings, each enclosed within a sealed bearing compartment. Under normal operating conditions, the rotor has a center of gravity that is radially coincident with a central axis passing through the centers of the bearings. The rotor also has a natural vibratory frequency which, by design, is higher than the rotor's maximum rotational frequency.

During engine operation, a fragment of a fan blade may become separated from the remainder of the blade so that the rotor's center of gravity is displaced from the central axis. Since the bearings constrain the rotor radially, it rotates about the central axis rather than about an axis passing through the displaced center of gravity. Therefore, potentially damaging imbalance forces are transmitted through the bearings to the support frame. Although the separation of a blade fragment is highly unlikely, it is common practice to make the support frame strong enough to withstand the imbalance forces until the engine can be safely shut down. Unfortunately, such strengthening of the support frame adds undesirable weight and bulk to the engine.

One possible way to minimize the weight and bulk of the support frame is to support the rotor on the frame with a support arrangement whose capability to radially constrain the rotor is abruptly relaxed (or completely defeated) upon being subjected to a radial force in excess of a predetermined value. Once the radial constraint capability is relaxed, the rotor is free to rotate about a rotational axis passing through, or at least closer to, the displaced center of gravity. As a result, the transmission of imbalance forces to the support frame is minimized so that its weight and bulk can be correspondingly reduced.

Mere relaxation of the radial constraint is not an entirely satisfactory way to minimize the transmission of imbalance forces to the support frame. In the event that the rotor support arrangement restrains the rotor longitudinally as well as radially, the relaxation of the radial constraint must be done in a way that does not compromise longitudinal support of the rotor. Moreover, the radially de-constrained rotor undergoes oscillatory radial deflections that can easily damage bearing compartment seals thereby permitting the leakage of lubricating and cooling oil out of the compartment. The loss of oil is not inconsequential in an aircraft turbine engine even though the engine is shut down subsequent to the separation of a blade fragment. The rotor of the disabled engine continues to rotate or "windmill" at a low rotational frequency due to the forward velocity of the aircraft. Such sustained rotation is desirable since it minimizes the aerodynamic drag created by the fan blades of the disabled engine. The loss of lubricating oil can cause the bearing to overheat and seize so that the rotor is incapable of windmilling. The accompanying increase in drag makes operation of the aircraft more difficult, especially if the affected engine is offset from the aircraft centerline.

Another potential drawback to merely relaxing the radial constraint on the rotor is related to the dynamics of the rotor and its supporting structure. Provided that the rotor's rotational frequency is less than the natural frequency, the phase angle between between the imbalance forces and the rotor deflection is, at high rotational frequency, somewhat less than 90 degrees. As long as the rotor and its support structure remain intact, the imbalance forces act to increase the amplitude of the deflection. Once the radial constraint is abruptly relaxed, the phase angle between the imbalance forces and deflection transitions to approximately 180 degrees. If this transition is not properly controlled by appropriate damping, excessive and potentially destructive displacements of the rotor centerline can result. At the very least, these displacements subject the engine's undamaged bearing supports to high magnitude forces.

A related disadvantage of merely relaxing the radial constraint may become apparent as the damaged rotor's rotational frequency converges on its windmilling rotational frequency. If the depressed natural frequency of the rotor system is similar to the windmilling frequency, the oscillatory deflections of the windmilling rotor may be amplified to resonant levels that could cause additional damage to the rotor.

Thus, it is seen that mere relaxation of the radial constraint on a rotor is not an entirely satisfactory means for accommodating an unbalanced rotor.

SUMMARY OF THE INVENTION

It is, therefore, an object of the invention to support a gas turbine engine rotor on a support frame so that the transmission of rotor imbalance forces to the frame is minimized while longitudinal support of the rotor is maintained.

It is another object of the invention to minimize any damage to oil seals during and subsequent to the onset of rotor imbalance.

It is yet another object of the invention to attenuate the severe rotor oscillations occuring immediately after the onset of rotor imbalance.

It is still another object of the invention to guard against resonant oscillations of a damaged rotor while the rotor is rotating at its windmilling rotational frequency.

According to the invention, an arrangement for supporting a turbine engine rotor on a support frame includes a destructible bearing support which disengages in response to an imbalance force and glides radially within a circumferentially extending channel without transmitting the imbalance force to the support frame and without compromising longitudinal support of the rotor.

In one embodiment of the invention, the bearing is enclosed within a sealed bearing compartment bounded in part by a seal ring and an abutting seal land which are radially displaceable with respect to each other. The abutting surfaces of the seal land and ring are three dimensional curved surfaces so that the relative radial displacement does not compromise the integrity of the seal.

In another embodiment of the invention, the support arrangement includes a damper which operates temporarily to damp excessive rotor oscillations.

In another embodiment of the invention, the support arrangement includes a centering system for recentering the imbalanced rotor and altering its natural frequency to suppress resonant oscillatory deflections at windmilling speed.

The primary advantage of the invention is the weight savings attributable to isolating the support frame from potentially damaging oscillatory forces exerted by the unbalanced rotor. Another advantage is the minimization of damage to bearing compartment seals to prevent loss of lubricant and consequent rotor seizure following the separation of a fan blade fragment. Other advantages include the capability to prevent resonant oscillations at windmilling rotational frequency.

The foregoing features and advantages and the operation of the invention will become more apparent in light of the following description of the best mode for carrying out the invention and the accompanying drawings.

BRIEF DESCRIPTION OF THE DRAWINGS

FIG. 4 is an enlarged view of a support arrangement similar to that of FIG. 1 and including a centering system for recentering an imbalanced rotor at low rotational frequency.

FIG. 5 is a cross sectional side view of an alternative embodiment of the invention in which a resilient bumper serves as a temporary damper to damp rotor oscillations.

FIG. 6 is a cross sectional side view of another alternative embodiment of the invention in which the destructible bearing support includes a crush susceptible cellular array.

FIG. 7 is a view of the crush susceptible cellular array taken in the direction 7—7 of FIG. 6.

BEST MODE FOR CARRYING OUT THE INVENTION

Figure 1:
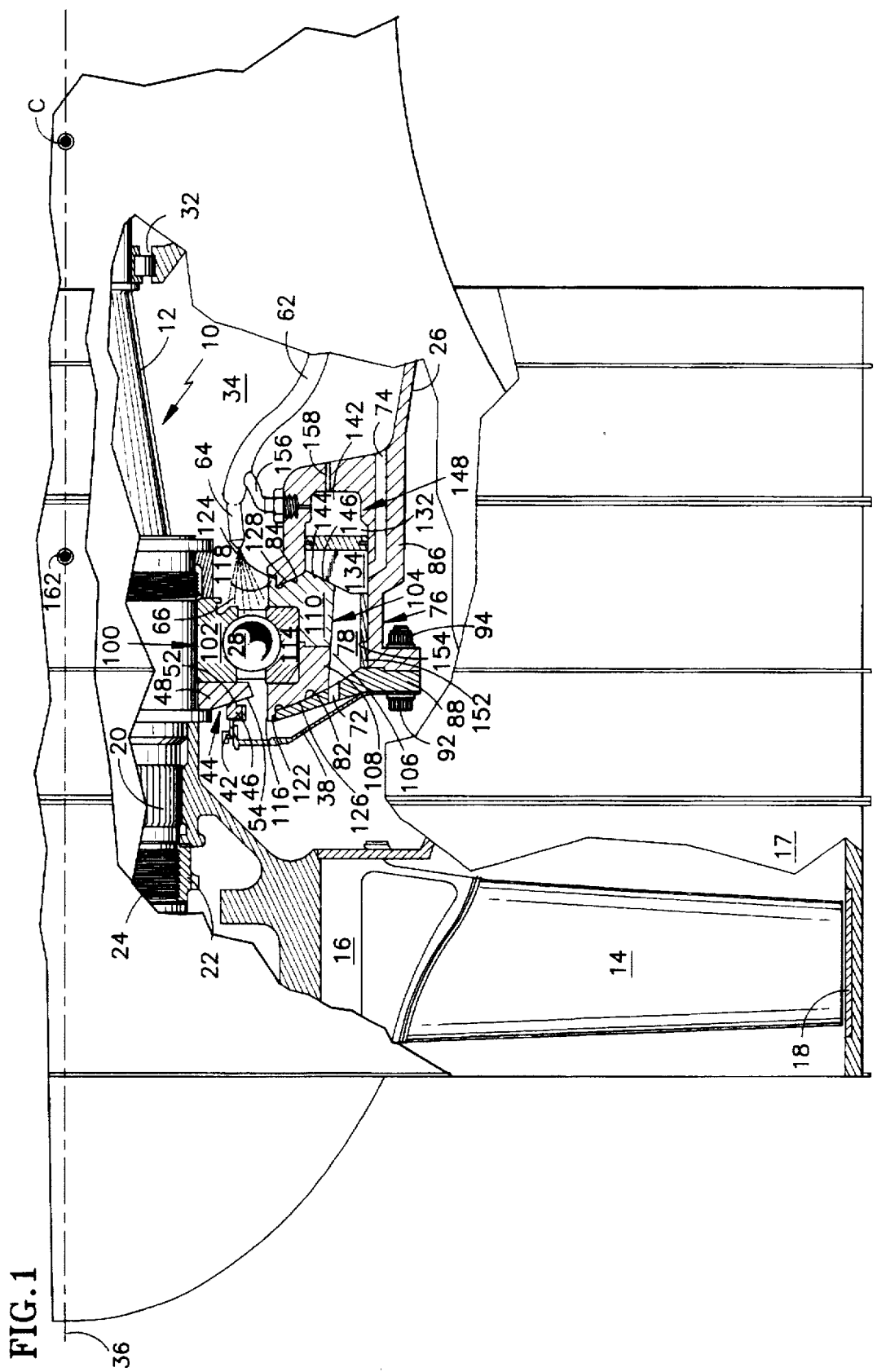
FIG. 1 is a cross sectional side view of gas turbine engine rotor support arrangement of the present invention with a destructible bearing support and a damping piston for temporarily damping rotor oscillations.

Referring to FIG. 1, an aircraft gas turbine engine includes a rotor 10 comprising a shaft 12 and an array of fan blades, such as representative blade 14, extending radially outwardly from a hub 16 and circumscribed by a fan case 17 having a rubstrip 18. Splines 20 and a coupling nut 22 secure the hub to the forward end 24 of the shaft. The rotor is rotatably supported on a support frame 26 by longitudinally spaced apart bearings such as ball bearing 28, roller bearing 32 and an additional bearing, not shown, near the aft end of the shaft. Bearings 28, 32 are enclosed within a sealed annular compartment 34 radially bounded by the shaft 12 and the support frame 26. The shaft is rotatable about a longitudinally extending central axis 36, which passes through the centers of the bearings, to convey power and rotary motion from a turbine, not shown, to a compressor, also not shown, and to the fan.

The forward end of the bearing compartment is bounded by a seal support 38, a seal carrier 42 and a seal 44. The seal 44 includes a nonrotatable seal ring 46 mounted on the carrier and a seal land 48 secured to the shaft. The seal ring and land have surfaces 52, 54 which abut each other to seal the forward end of the bearing compartment. An analogous sealing arrangement, not shown, bounds the other end of the compartment, aft of the roller bearing 32.

A lubrication system includes an oil supply conduit 62 and a plurality of circumferentially distributed spray nozzles 64 for injecting cooling and luibricating oil 66 into the interior of the compartment. Discharge passages 72, 74 in the support frame define a path for returning used oil to the lubrication system deaerators, filters and pumps. The seal 44 prevents undesirable oil leakage out of the compartment.

The forward end of the support frame is a housing 76 having a circumferentially extending channel 78 with forward and aft faces 82, 84. The housing comprises an integral extension 86 of the frame and a cap 88 secured to the extension by bolts and nuts 92, 94. Although the entire housing could be made integral with the frame, the illustrated construction is preferred since it simplifies manufacture and assembly.

According to the invention, the bearing has a durable support 100 such as inner race 102 affixed to the shaft and a destructible support 104. In the illustrated embodiment, the destructible support comprises a two piece support ring 106 whose halves, 108, 110 are bolted together, and a bearing outer race 114. The destructible support has forward and aft sacrificial flanges 116, 118 extending longitudinally from the support ring. Each flange rests on a corresponding ledge 122, 124 on the housing to position and support the support ring so that the support ring is nested within the channel with its forward and aft faces 126, 128 abutting the forward and aft faces 82, 84 of the channel. The faces 82, 84, 126 and 128 of the channel and support ring and the surfaces 52, 54 of the seal ring and land are three dimensional curved surfaces such as spherical surfaces having a common center C substantially coincident with the central axis. The significance of the curved surfaces and faces will become clear in view of the following discussion of the operation of the invention.

Figure 2:
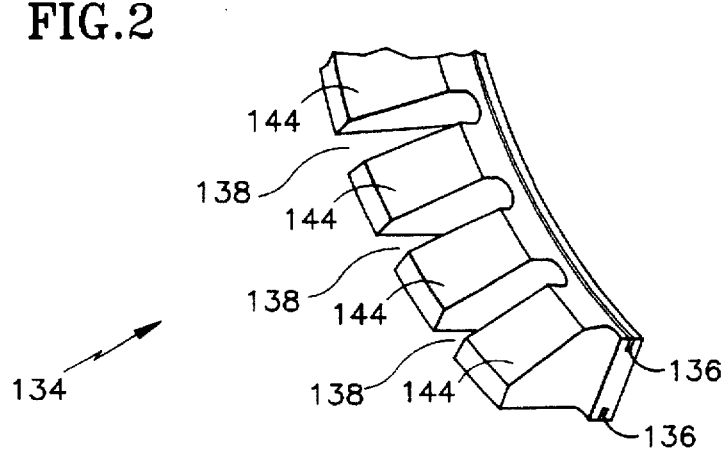
FIG. 2 is a perspective view of a portion of the damping piston of FIG. 1.
Figure 3A:
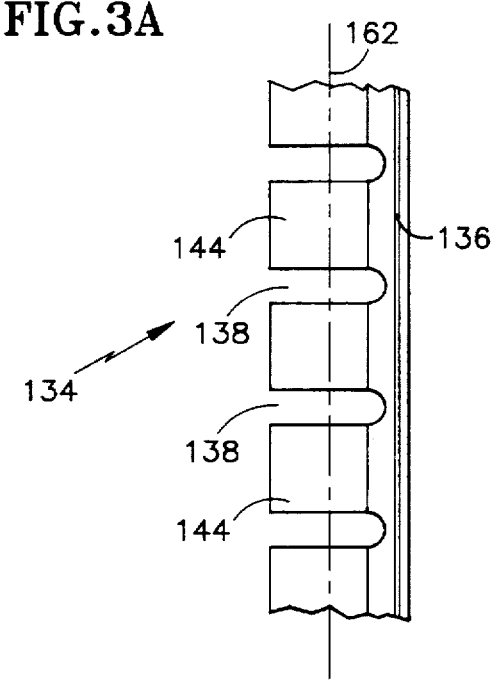
FIGS. 3A and 3B are developed views of the damping piston of FIG. 2 showing the piston in an undeformed state and in a deformed state respectively.

The housing 76 may also include an annular recess 132. An annular piston 134 having perimeter seals 136 and circumferentially distributed slots 138 (FIGS. 2, 3A and 3B) is disposed in the recess and cooperates therewith to define an oil filled damping chamber 142. The piston has a beveled surface 144 in contact with a corresponding beveled surface 146 on the support ring. As explained more fully below, the piston is aftwardly displaceable into the recess so that the piston and damping chamber operate as a temporary vibration damper 148 in the event that the rotor becomes unbalanced. A spacer 152 installed on the floor 154 of the channel limits forward translation of the piston during assembly. The spacer also resists circumferentially localized forward translation of the piston during temporary operation of the damper so that its damping capability is not undermined.

A branch line 156 extending from the oil supply conduit 62 directs a portion of the bearing lubricating oil into the damping chamber. A vent 158 permits oil to flow out of the chamber so that during normal engine operation, the piston is substantially in equilibrium—neither urged forwardly against the spacer 152 and the support ring 106, nor rearwardly into the recess 132.

During normal engine operation, rotor's center of gravity is substantially coincident with the central axis, and the bearings constrain the rotor to rotate about that axis. In the event that the rotor becomes unbalanced, as would occur following the separation of a fan blade fragment, the rotor center of gravity is displaced from the centerline. As long as the bearing constrains the rotor to rotate about axis 36, rather than about a rotational axis through (or at least closer to) the displaced center of gravity, substantial imbalance forces are transmitted to the support frame.

The support arrangement of the present invention minimizes the transmission of imbalance forces to the support frame. When subjected to radial forces of a magnitude consistent with separation of a fan blade fragment, the sacrificial flanges 116, 118 of support ring break away abruptly so that the destructible support disengages from the housing. That is, the support ring is no longer radially constrained in the housing, but instead is free to glide radially in the channel. Subsequent to disengagement of the destructible support, the rotor continues to rotate and that portion of the rotor forward of the roller bearing 32 deflects and oscillates radially. The combined rotation and oscillatory deflection of the rotor causes any arbitrary point on the rotor forward of the roller bearing to trace out a three dimensional curved surface. Each traced surface approximates a spherical surface centered at the center of curvature C, where the exact location of C depends on factors such as rotor gyroscopic effects, the stiffness of the rotor and the locations of other, undamaged bearings which radially constrain the rotor. The faces 82, 84, 126 and 128 of the channel and support ring mimic the traced surfaces, and therefore the support ring glides smoothly in the channel to accommodate the abnormal oscillatory deflection without transmitting the radial imbalance forces to the frame. Moreover, the support ring remains nested within the channel to provide continued longitudinal restraint of the rotor.

Deflection of the rotor also causes seal land 48 to be radially displaced with respect to the seal ring 46. Accordingly, the surfaces 52, 54 of the seal ring and seal land are also spherical surfaces centered at C so that the relative displacement of those surfaces occurs nondestructively, i.e with minimal damage to the land and ring. As a result, leakage of lubricating oil past the seal is minimized thereby preventing rotor seizure and an accompanying increase in aerodynamic drag.

Immediately after the separation of a blade fragment, the phase angle between the instantaneous direction of the imbalance force and the instantaneous direction of the rotor deflection is approximately 90 degrees, resulting in particularly severe rotor oscillations. Some damping of these oscillations will arise from contact between the fan blades of the oscillating rotor and the fan case rubstrip 18. Nevertheless, it may be desirable to provide additional damping. Vibration damper 148 operates temporarily to facilitate a transition to a more benign, approximately 180 degree phase relationship between the imbalance and the deflection. The severe radial deflection of the rotor forcibly urges the beveled surface 146 of the support ring against the beveled surface 144 of the piston 134 thereby driving the piston further into the recess. The longitudinal displacement of the piston forces oil out of the damping chamber by way of the branch line 156 and the vent 158 (which acts as a metering device when the piston is driven into the recess) to damp the excessive rotor deflections. Once the deflections stabilize at a less severe amplitude, and the rotor's rotation stabilizes about its displaced center of gravity, no further damping is required. Therefore, no restorative force is applied to the piston to urge it forwardly toward the open end of the recess and back into contact with the support ring. Thus, it is seen that the damper operation is temporary, beginning no earlier than the time at which the destructible support abruptly disengages from the housing and ending no later than the time at which the rotor rotation stabilizes about the displaced center of gravity. Equally significantly, the absence of sustained contact between the piston and the support ring ensures that no imbalance forces are transmitted from the oscillating rotor to the support frame.

Figure 3B:
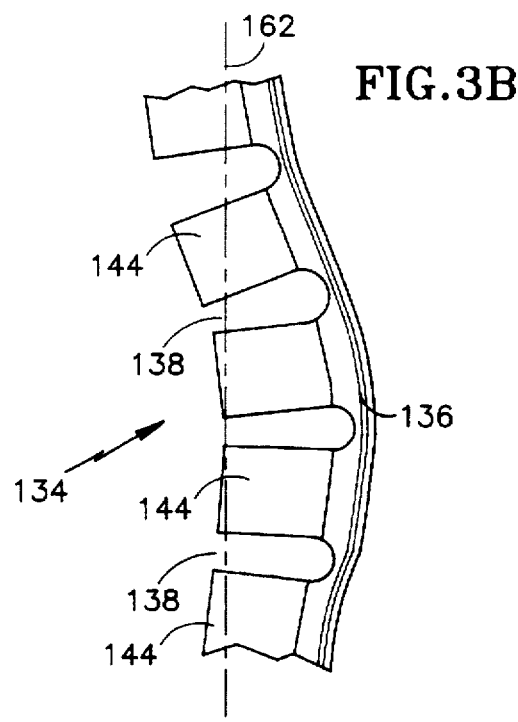

Because of the oscillatory character of the rotor deflection, the force exerted on the piston by the support ring is a circumferentially localized force that progresses around the circumference of the piston rather than a circumferentially uniform force. The circumferentially localized character of the driving force tends to cause the piston to lean about a transverse axis 162 and jam rather than slide smoothly into the recess. If the piston jams, the intended damping action is defeated. Therefore the piston includes slots 138 that give the piston sufficiently flexible to elastically deform from its undeformed state (FIG. 3A) to a locally deformed state (FIG. 3B). Consequently the piston is driven into the recess in a circumferentially progressive fashion and the likelihood of jamming is minimized.

If the unbalanced rotor has a natural frequency approximately equal to the rotor's windmilling rotational frequency, then the windmilling rotor will experience potentially destructive resonant oscillations. Therefore, it may be desirable to slightly alter the rotor's natural frequency and suppress the high amplitude resonant deflections. One system for accomplishing such an adjustment is a recentering system 164 shown in FIG. 4. The illustrated system employs one or more springs 166 spaced around the circumference of the damping chamber 142. The springs exert a restorative force that urges the beveled surface 144 of the piston 134 into contact with the beveled surface 146 of the support ring 106. The restorative force may also be applied by any other convenient means, for example by pressurizing the oil in the damping chamber. Whatever its origin, the restorative force tends to recenter the rotor and, more importantly, stiffens the rotor slightly to shift its natural frequency away from the windmilling frequency. The restorative force also keeps the piston in contact with the support ring 106 during normal, balanced operation to ensure that the damper operates without delay in response to the onset of any rotor imbalance. Although the restorative force will be reacted through the support frame, and therefore will transmit imbalance forces to the frame, the imbalance forces during windmilling operation are insufficient to jeopardize the structural integrity of the frame. Moreover, the magnitude of the restorative force is chosen to satisfy the conflicting requirements of minimizing the transmission of imbalance forces to the frame while altering the rotor's natural frequency enough to inhibit resonant vibrations.

Another embodiment of the invention is illustrated in FIG. 5. This embodiment includes a deflection limiter in the form of a bumper 172 on the floor 154 of the channel. The bumper is made of rubber or other resilient material and is protected from impact forces by metallic impact shield 174. The illustrated embodiment operates essentially the same way as the previously described embodiments. Flanges 116, 118 break away in response to excessive imbalance forces so that the destructible support glides smoothly in the channel 78. High amplitude deflections are limited by contact between the support ring 106 and the bumper, with the shield 174 limiting impact damage to the bumper. Once the rotor oscillations have decayed in amplitude, no further contact occurs between the support ring and the bumper so that imbalance forces are not transmitted to the frame. A temporary damper and an optional recentering system are not included in the illustrated embodiment. Accordingly, this specific configuration is most applicable to rotors whose undamped oscillations are tolerable and whose natural frequency, subsequent to loss of a fan blade fragment, differs from the rotor's windmilling rotational frequency.

FIG. 6 illustrates a simplified, alternative embodiment of the invention in which the destructible support comprises a one piece support ring 106 supported in the channel 78 by a layer 176 of permanently deformable material. The deformable layer may be a crush susceptible cellular array such as the thin walled array of honeycomb cells 178 shown in FIG. 7. When subjected to the excessive radial imbalance force, the deformable layer yields so that the support ring 106 disengages from the housing and is free to glide in the channel thereby precluding the transmission of imbalance forces to the frame 26. The illustrated embodiment does not, however, include a temporary damper or a recentering system and therefore its use is restricted to applications in which damping and natural frequency alteration at windmilling conditions are judged unnecessary.

Various changes and modifications to the invention may occur to those skilled in the art. For example the locations of the destructible and durable supports may be reversed so that destructible support is nested within a housing affixed to the shaft, and the durable support is secured to the support frame. These and other changes and modifications may be made without departing from the spirit and scope of the invention.

We claim:

1. A support arrangement for a rotor including a shaft rotatable about a longitudinally extending axis, comprising:
   a nonrotatable support frame; and
   a bearing, radially interposed between the shaft and the frame for supporting the shaft on the frame, the bearing having a durable support affixed to one of the shaft and the frame and a destructible support nested within a circumferentially extending channel in a housing attached to the other of the shaft and the frame, so that upon application of a radial force in excess of a predefined threshold the destructible support disengages to accommodate abnormal deflection of the shaft while providing longitudinal support thereof.

2. The support arrangement of claim 1, wherein:
   the bearing is enclosed within a sealed bearing compartment bounded in part by a seal comprising a seal land and a seal ring, the land and the seal ring having abutting sealing surfaces and being displaceable relative to each other in response to the abnormal deflection of the shaft;
   the channel is defined in part by forward and aft faces of the housing, the destructible support also having forward and aft faces abutting, respectively, the forward and aft faces of the channel; and
   the abutting surfaces, the channel faces and the destructible support faces are three dimensional curved surfaces so that during the abnormal deflection of the shaft the relative displacement of the sealing surfaces occurs nondestructively to preserve the integrity of the seal and the destructible support glides in the channel to accommodate the abnormal shaft deflection without transmitting imbalance forces to the frame.

3. The support arrangement of claim 2 wherein the three dimensional curved surfaces are spherical surfaces having a common center.

4. The support arrangement of claim 1 or 2 wherein the destructible support comprises a support ring with sacrificial flanges extending therefrom, the housing includes a ledge corresponding to each flange to position the support ring in the channel for normal operation, the flanges being destructible upon application of the excessive radial force so that the destructible support disengages to accommodate abnormal deflection of the shaft.

5. The support arrangement of claim 1 or 2 wherein the destructible support comprises a support ring and a deformable layer, the deformable layer being permanently deformable upon application of the excessive radial force.

6. The support arrangement of claim 5, wherein the deformable layer is a cellular array.

7. The support arrangement of claim 1 or 2, wherein the excessive radial force is attributable to a rotor imbalance arising from a displaced center of gravity of the rotor, and the support arrangement comprises a damper, operable for no more than a limited interval of time, the interval beginning no earlier than the time of disengagement of the destructible support and ending no later than when the rotor rotation stabilizes about the displaced center of gravity.

8. The support arrangement of claim 7 wherein the housing includes a recess, and the damper comprises a piston disposed within the recess and cooperating therewith to define a damping chamber, the piston being displaceable into the recess in response to rotor deflection so that a fluid in the chamber temporarily damps oscillations of the rotor.

9. The support arrangement of claim 8 wherein the piston and the destructible support have beveled surfaces which cooperate in response to rotor deflection so that radial displacement of the destructible support induces longitudinal displacement of the piston and accompanying damping of rotor oscillations.

10. The support arrangement of claim 7 comprising a centering system for applying a restorative force to the shaft subsequent to disengagement of the destructible support, the centering force being sufficient to stiffen the rotor and alter the rotor's natural frequency to inhibit resonant vibrations during windmilling operation of the rotor without transmitting imbalance forces to the frame.

11. The support arrangement of claim 10 wherein the centering system includes a spring.

* * * * *